US012670574B2

(12) United States Patent
Kim et al.

(10) Patent No.: US 12,670,574 B2
(45) Date of Patent: Jun. 30, 2026

(54) APPARATUS AND METHOD FOR PREDICTING WELD QUALITY

(71) Applicant: SK On Co., Ltd, Seoul (KR)

(72) Inventors: Hyeong Won Kim, Daejeon (KR); Jae Hun Kim, Daejeon (KR); Hyeon Jeong You, Daejeon (KR); Ki Dong Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 329 days.

(21) Appl. No.: 18/540,123

(22) Filed: Dec. 14, 2023

(65) Prior Publication Data

US 2024/0221142 A1      Jul. 4, 2024

(30) Foreign Application Priority Data

Jan. 4, 2023      (KR) ........................ 10-2023-0001396

(51) Int. Cl.
*G06T 7/00*          (2017.01)
*G01N 21/88*          (2006.01)
(Continued)

(52) U.S. Cl.
CPC ....... *G06T 7/0004* (2013.01); *G01N 21/8851* (2013.01); *G06T 7/50* (2017.01);
(Continued)

(58) Field of Classification Search
None
See application file for complete search history.

(56) References Cited

U.S. PATENT DOCUMENTS

| | | | | |
|---|---|---|---|---|
| 2021/0318673 A1* | 10/2021 | Kitchen | ............... | B23K 31/006 |
| 2022/0011726 A1* | 1/2022 | Schwarz | ............. | G05B 13/027 |
| 2023/0201956 A1* | 6/2023 | Schwarz | ............. | B23K 1/0056 |
| | | | | 219/121.85 |

FOREIGN PATENT DOCUMENTS

| | | |
|---|---|---|
| CN | 111738369 A | 10/2020 |
| CN | 112548321 A | 3/2021 |

(Continued)

OTHER PUBLICATIONS

Cai et al ("Real-time identification of molten pool and keyhole using a deep learning-based semantic segmentation approach in penetration status monitoring", Journal of Manufacturing Processes, vol. 76, Mar. 5, 2022, pp. 695-707, XP093147546) (Year: 2022).*

(Continued)

*Primary Examiner* — Leon Viet Q Nguyen

(74) *Attorney, Agent, or Firm* — IP & T GROUP LLP

(57)          ABSTRACT

An apparatus for predicting weld quality includes an image sensor acquiring an image of a welding portion of a workpiece, a storage storing a shape detection model, a depth prediction model and a strength prediction model, and a controller configured to acquire shapes of a melt pool and a keyhole by receiving the image and inputting the image to the shape detection model, acquire a penetration depth of the keyhole by inputting the shapes of the melt pool and the keyhole to the depth prediction model, and acquire a tensile strength by inputting one of the shape of the melt pool, the shape of the keyhole and the shapes of the melt pool and the keyhole and the penetration depth of the keyhole to the strength prediction model. The weld quality of all products may be predicted during a welding process.

12 Claims, 7 Drawing Sheets

(51) Int. Cl.

| | | |
|---|---|---|
| *G06T 7/50* | (2017.01) | |
| *G06V 10/764* | (2022.01) | |
| *G06V 10/77* | (2022.01) | |
| *G06V 10/774* | (2022.01) | |
| *G06V 20/50* | (2022.01) | |
| *G06V 10/82* | (2022.01) | |

(52) U.S. Cl.

CPC ........ *G06V 10/764* (2022.01); *G06V 10/7715* (2022.01); *G06V 10/774* (2022.01); *G06V 20/50* (2022.01); *G01N 2021/8887* (2013.01); *G06T 2207/20081* (2013.01); *G06T 2207/20084* (2013.01); *G06T 2207/30164* (2013.01); *G06V 10/82* (2022.01)

(56) References Cited

FOREIGN PATENT DOCUMENTS

| | | | |
|---|---|---|---|
| CN | 113751920 | A | 12/2021 |
| KR | 10-2019-0064216 | A | 6/2019 |
| KR | 20210091789 | A | 7/2021 |
| KR | 20220032102 | A | 3/2022 |
| WO | 2020104103 | A1 | 5/2020 |
| WO | 2021023368 | A1 | 2/2021 |
| WO | 2021224255 | A1 | 11/2021 |

OTHER PUBLICATIONS

Rongwei Yu et al., Real-Time Prediction of Welding Penetration Mode and Depth Based on Visual Characteristics of Weld Pool in GMAW Process, IEEE Access, Apr. 28, 2020, vol. 8, pp. 81564-881573, IEEE.

Wang Cai et al., Real-time monitoring of laser keyhole welding penetration state based on deep belief network, Journal of Manufacturing Processes, Oct. 26, 2021, vol. 72, pp. 203-214, Elsevier.

Wang Cai et al., Real-time identification of molten pool and keyhole using a deep learning-based semantic segmentation approach in penetration status monitoring, Journal of Manufacturing Process, Mar. 5, 2022, vol. 76, pp. 695-707, Elsevier.

Extended European Search Report for European Patent Application No. 23215603.4 issued by the European Patent Office on Apr. 16, 2024.

* cited by examiner

APPARATUS AND METHOD FOR PREDICTING WELD QUALITY

CROSS REFERENCE TO RELATED APPLICATION

The present application claims priority to Korean Patent Application No. 10-2023-0001396, filed Jan. 4, 2023, the entire contents of which is incorporated herein for all purposes by this reference.

BACKGROUND

1. Technical Field

The present disclosure relates to an apparatus and method for predicting weld quality.

2. Related Art

In the process of manufacturing the battery module of a secondary battery, welding may be performed to fix electrodes and a busbar of the secondary battery. Welding of the electrodes and the busbar may be performed using a method such as laser welding. In addition to the electrodes and the busbar, welding may be performed to couple the case of the battery module or various other metal structures. When weld quality is not good, a welded portion may break due to vibration, etc., causing a problem in the operation of the battery module. Among methods for checking weld quality, a method of checking weld quality by cutting a welded sample may not be applied to all products.

RELATED ART DOCUMENTS

Patent Documents (Patent Document 1) KR 10-2021-0091789 A

SUMMARY

The present disclosure is to provide an apparatus and method for predicting weld quality using a learned artificial intelligence model and a camera.

According to a first aspect of the present disclosure, an apparatus for predicting weld quality may include: an image sensor acquiring an image of a welding portion of a workpiece; a storage storing a shape detection model, a depth prediction model and a strength prediction model; and a controller configured to acquire shapes of a melt pool and a keyhole by receiving the image and inputting the image to the shape detection model, acquire a penetration depth of the keyhole by inputting the shapes of the melt pool and the keyhole to the depth prediction model, and acquire a tensile strength by inputting one of the shape of the melt pool, the shape of the keyhole and the shapes of the melt pool and the keyhole and the penetration depth of the keyhole to the strength prediction model.

According to an embodiment, the shape detection model may be an artificial intelligence model learned using a first learning dataset in which the image of the welding portion is first learning data and the shapes of the melt pool and the keyhole are first label data, and when the image of the welding portion is received, may detect and output the shapes of the melt pool and the keyhole.

According to an embodiment, the shape detection model may be an artificial intelligence model configured by a backbone structure in which feature maps of various scales are extracted while passing the image through multiple convolution layers, a neck structure in which the scales of the feature maps extracted in the backbone structure are up-down sampled and combined, and a head structure in which classification and detection are performed using the feature maps combined in the neck structure.

According to an embodiment, the shape of the melt pool may include a position and size of the melt pool, and the shape of the keyhole may include a position and size of the keyhole.

According to an embodiment, the tensile strength may be acquired at each point from a welding start point to a welding end point of the workpiece.

According to an embodiment, the depth prediction model may be an artificial intelligence model learned using a second learning dataset in which the shapes of the melt pool and the keyhole are second learning data and the penetration depth of the keyhole is second label data, and when the shapes of the melt pool and the keyhole are inputted, may predict and output the penetration depth of the keyhole.

According to an embodiment, the depth prediction model may have a convolutional neural network structure which extracts features, and may be an artificial intelligence model which extracts a scalar value by applying a linear function in a last layer of the convolutional neural network structure.

According to an embodiment, the strength prediction model may be an artificial intelligence model learned using a third learning dataset in which one of the shape of the melt pool, the shape of the keyhole and the shapes of the melt pool and the keyhole and the penetration depth of the keyhole are third learning data and the tensile strength of the welding portion is third label data, and when one of the shape of the melt pool, the shape of the keyhole and the shapes of the melt pool and the keyhole and the penetration depth of the keyhole are inputted, may predict and output the tensile strength of the welding portion.

According to an embodiment, the strength prediction model may have a deep neural network structure which extracts features of one of the shape of the melt pool, the shape of the keyhole and the shapes of the melt pool and the keyhole and the penetration depth of the keyhole, and may be an artificial intelligence model which extracts a scalar value by applying a linear function in a last layer of the deep neural network structure.

According to an embodiment, the apparatus for predicting weld quality may further include a distance sensor measuring the penetration depth of the keyhole of the welding portion in a process of welding a sample of the workpiece, wherein the controller stores the measured penetration depth of the keyhole in the storage as label data for learning the depth prediction model.

According to a second aspect of the present disclosure, a method for predicting weld quality may include: a model generation step of generating a shape detection model, a depth prediction model and a strength prediction model by learning artificial intelligence models using learning datasets; and a quality prediction step of acquiring shapes of a melt pool and a keyhole by inputting an image of a welding portion of a workpiece to the shape detection model, acquiring a penetration depth of the keyhole by inputting the shapes of the melt pool and the keyhole to the depth prediction model and acquiring a tensile strength by inputting one of the shape of the melt pool, the shape of the keyhole and the shapes of the melt pool and the keyhole and the penetration depth of the keyhole to the strength prediction model.

According to an embodiment, the model generation step may include a sample image sensing step of acquiring an image of a welding portion while welding a sample workpiece; a distance sensing step of measuring a penetration depth of a keyhole formed in the welding portion; a step of generating the shape detection model using a first learning dataset in which the image of the welding portion is first learning data and shapes of a melt pool and the keyhole are first label data; a step of generating the depth prediction model using a second learning dataset in which the shapes of the melt pool and the keyhole are second learning data and the penetration depth of the keyhole is second label data; and a step of generating the strength prediction model using a third learning dataset in which one of the shape of the melt pool, the shape of the keyhole and the shapes of the melt pool and the keyhole and the penetration depth of the keyhole are third learning data and a tensile strength of the welding portion is third label data.

According to an embodiment, the quality prediction step may include an image sensing step of acquiring the image of the welding portion of the workpiece; a shape detection step of acquiring the shapes of the melt pool and the keyhole by inputting the image to the shape detection model; a depth prediction step of acquiring the penetration depth of the keyhole by inputting the shapes of the melt pool and the keyhole to the depth prediction model; and a strength prediction step of acquiring a tensile strength by inputting one of the shape of the melt pool, the shape of the keyhole and the shapes of the melt pool and the keyhole acquired in the shape detection step and the penetration depth of the keyhole acquired in the depth prediction step, to the strength prediction model.

Features and advantages of the present disclosure will be more apparent from the following detailed description taken in conjunction with the accompanying drawings.

Prior to the following detailed description, the terms or words used in the specification and the claims of the present disclosure should not be construed as being typical or dictionary meanings, but should be construed as meanings and concepts conforming to the technical spirit of the present disclosure on the basis of the principle that an inventor can properly define the concepts of the terms in order to describe his or her invention in the best way.

According to the embodiments of the present disclosure, the weld quality of all products may be predicted during a welding process.

According to the embodiments of the present disclosure, since weld quality is predicted through three steps using three artificial intelligence models that have independently learned the influence of important factors exerted on welding, it is possible to predict weld quality with high accuracy.

DETAILED DESCRIPTION

Figure 1:
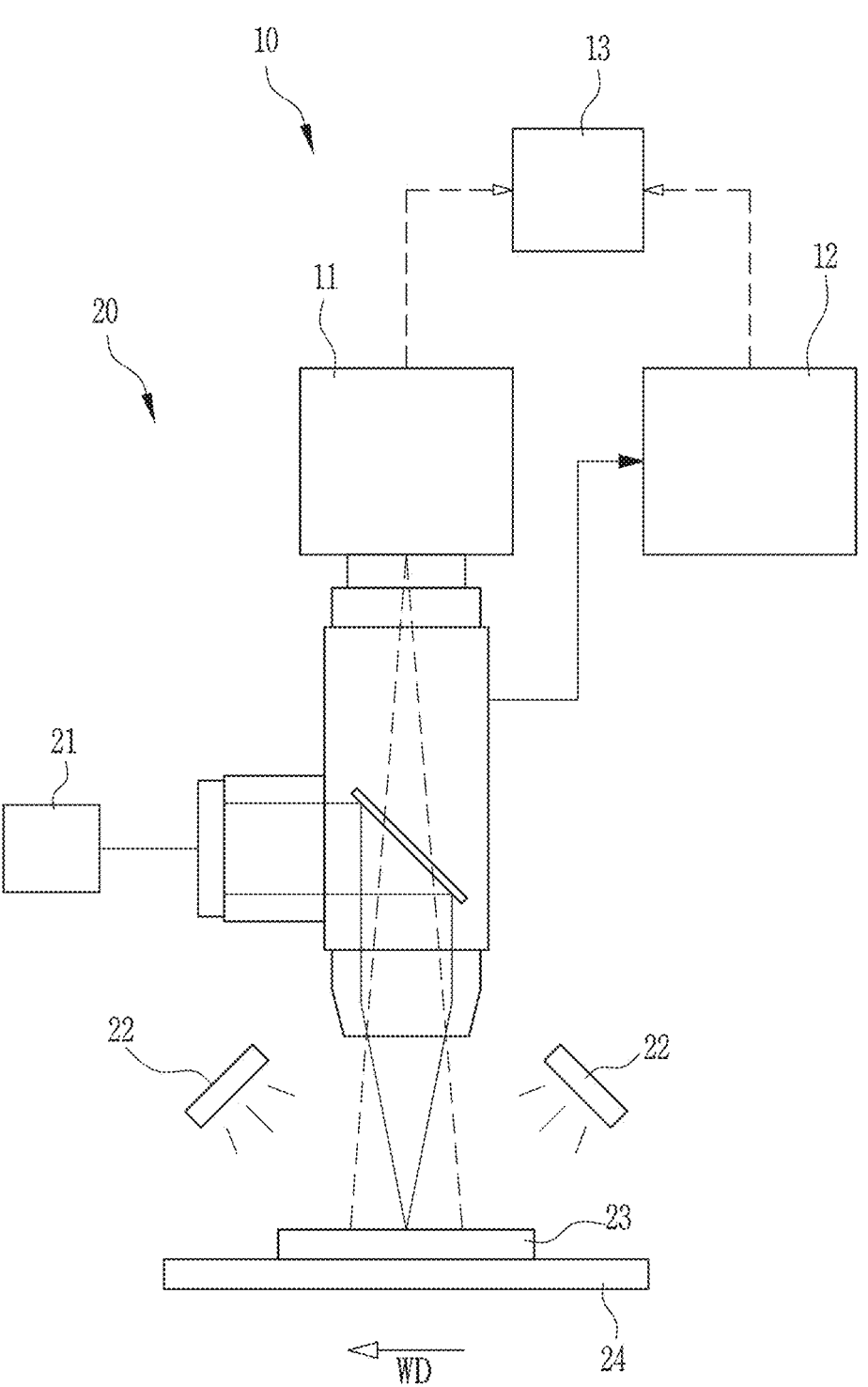
FIG. 1 is a diagram illustrating an environment in which an apparatus for predicting weld quality in accordance with an embodiment is used.

The objects, advantages, and features of the present disclosure will be more apparent from the following detailed description of embodiments taken in conjunction with the accompanying drawings, but the present disclosure is not limited thereto. In describing the present disclosure, when it is determined that the detailed description of the related art may obscure the gist of the present disclosure, the detailed description will be omitted.

In the following description, the same components will be designated by the same reference numerals although they are shown in different drawings, and similar components will be designated by similar reference numerals.

The terminology used to describe an embodiment of the present disclosure is not intended to limit the present disclosure. Singular expressions include plural expressions unless the context clearly dictates otherwise.

Drawings may be schematic or exaggerated to illustrate implementations.

In this document, expressions such as "have", "may have", "include" or "may include" indicate the presence of corresponding features (e.g., numerical values, functions, operations, or components such as parts), but do not exclude the presence of additional features.

The terms such as "one", "other", "another", "first" and "second" are used to differentiate a certain component from other components, but components are not limited by the terms.

Terms indicating directions such as up, down, left, right, X-axis, Y-axis, Z-axis, etc. are only for the sake of convenience in explanation, and it should be understood that the terms may be expressed differently depending on the position of an observer or the position of an object.

Embodiments described in the present document and the accompanying drawings are not intended to limit the present disclosure to specific implementations. It should be understood that the present disclosure includes various modifications, equivalents and/or alternatives of embodiments.

Hereinafter, an embodiment of the present disclosure will be described in detail with reference to the accompanying drawings.

FIG. 1 is a diagram illustrating an environment in which an apparatus 10 for predicting weld quality in accordance with an embodiment is used.

A laser welding device 20 may weld a workpiece 23 which is placed in a work space 24. The workpiece 23 maybe an electrode of a battery cell and a busbar of a secondary battery. The workpiece 23 maybe the case of the battery module of a secondary battery. The battery cell and the busbar may be placed in the work space 24, and welding may be performed while the battery cell and the busbar are moved in a direction opposite to a welding direction WD. A laser module 21 of the laser welding device 20 may output a laser, and the laser may reach the workpiece 23 through an optical system. A lighting 22 may illuminate a welding portion of the workpiece 23. The lighting 22 may provide light necessary for the apparatus 10 for predicting weld quality to acquire the image of the welding portion.

The apparatus 10 for predicting weld quality may predict weld quality by observing in real time a process in which the laser welding device 20 welds the workpiece 23. Weld quality may be expressed by various parameters. According to an embodiment, weld quality may be predicted by predicting tensile strength. Tensile strength is a parameter that expresses a maximum stress until the welded workpiece 23 is broken. Therefore, if tensile strength is high, it may be regarded that weld quality is good.

The apparatus 10 for predicting weld quality may include an image sensor 11 and a distance sensor 12 which are added to the laser welding device 20. The image sensor 11 may include a high speed camera. The image sensor 11 may acquire the image of the welding portion using the high speed camera. In FIG. 1, an area to be captured by the image sensor 11 is indicated by a dotted line. The distance sensor 12 may include an optical coherence tomography (OCT) device which is disposed coaxially with the image sensor 11. The image sensor 11, the distance sensor 12 and the laser emitted from the laser module 21 are disposed coaxially, and the image sensor 11 and the distance sensor 12 may accurately observe the welding portion. The distance sensor 12 may measure the penetration depth of a keyhole which is formed in the welding portion, by using the OCT device. A controller 13 may predict weld quality by receiving the image of the welding portion from the image sensor 11. The controller 13 may generate and use an artificial intelligence model for predicting weld quality, by receiving the penetration depth of the keyhole from the distance sensor 12. The distance sensor 12 is used to learn the artificial intelligence model. When the apparatus 10 for predicting weld quality predicts the weld quality of a product in a state in which the artificial intelligence model is learned, the distance sensor 12 may not be necessary.

Figure 2:
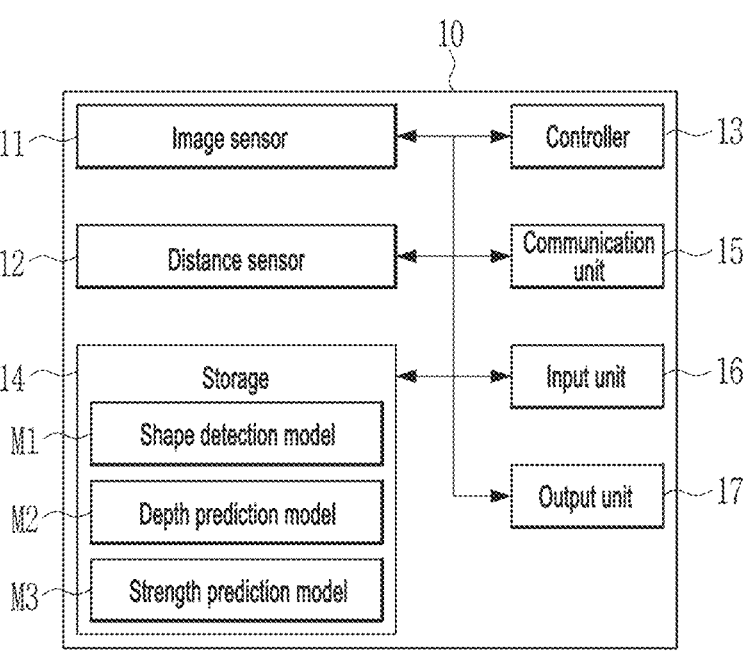
FIG. 2 is a block diagram showing the configuration of the apparatus for predicting weld quality in accordance with the embodiment.

FIG. 2 is a block diagram showing the configuration of the apparatus 10 for predicting weld quality in accordance with the embodiment.

The apparatus 10 for predicting weld quality in accordance with the embodiment may include the image sensor 11 which acquires the image of a welding portion of the workpiece 23, a storage 14 which stores a shape detection model M1, a depth prediction model M2 and a strength prediction model M3, and the controller 13 which receives the image and inputs the image to the shape detection model M1 to acquire shapes of a melt pool and a keyhole, inputs the shapes of the melt pool and the keyhole to the depth prediction model M2 to acquire the penetration depth of the keyhole and inputs one of the shape of the melt pool, the shape of the keyhole and the shapes of the melt pool and the keyhole and the penetration depth of the keyhole to the strength prediction model M3 to acquire a tensile strength. The apparatus 10 for predicting weld quality may further include the distance sensor 12 which measures the penetration depth of the keyhole of the welding portion in the process of welding a sample of the workpiece 23. The controller 13 may store the measured penetration depth of the keyhole in the storage 14 as label data for learning the depth prediction model M2.

The apparatus 10 for predicting weld quality may further include a communication unit 15, an input unit 16 and an output unit 17. The image sensor 11, the distance sensor 12, the controller 13, the storage 14, the communication unit 15, the input unit 16 and the output unit 17 maybe connected to be capable of communication.

The image sensor 11 may generate an image by capturing in real time a portion where the workpiece 23 is welded, and may provide the image to the controller 13.

The distance sensor 12 may measure the penetration depth of the keyhole by capturing in real time the portion where the workpiece 23 is welded, and may provide the measured penetration depth to the controller 13.

The storage 14 may store artificial intelligence models which are used to predict weld quality. The storage 14 may store the shape detection model M1, the depth prediction model M2 and the strength prediction model M3. The storage 14 may store data or program codes which are necessary to predict weld quality. A method for predicting weld quality may be written as the program codes and be stored in the storage 14. The method for predicting weld quality may be executed as the program codes are executed by the controller 13.

On the basis of the image received from the image sensor 11, the controller 13 may predict weld quality using the shape detection model M1, the depth prediction model M2 and the strength prediction model M3. The controller 13 may read and execute the shape detection model M1, the depth prediction model M2 and the strength prediction model M3 stored in the storage 14. The controller 13 may include at least one processor, a Central Processing Unit (CPU), a Graphics Processing Unit(GPU) or another information-processable element. The controller 13 may operate the apparatus 10 for predicting weld quality in accordance with the embodiment, by reading and executing the program codes stored in the storage 14.

The communication unit 15 may transmit and receive data by being connected to a wired or wireless network. The communication unit 15 maybe connected to a remote management system. The controller 13 may transmit a result of estimating weld quality, through the communication unit 15. The controller 13 may provide a notification to the remote management system through the communication unit 15 when a product with weld quality lower than a set reference is found. The remote management system may provide a notification to a user to handle the product with low weld quality as a bad product.

The input unit 16 maybe used for the user to input a command or data. The input unit 16 may include input devices such as a keyboard, a mouse, a microphone, a button, a touch panel, a touch screen and so on.

The output unit 17 may display a weld quality prediction result to the user. The output unit 17 may include a display, a speaker, a printer and so on.

In the apparatus 10 for predicting weld quality, the controller 13, the storage 14, the communication unit 15, the input unit 16 and the output unit 17 maybe implemented in the form of a computer device, a server, a PC or the like. The image sensor 11 and the distance sensor 12 maybe connected to a computer device.

Figure 3:
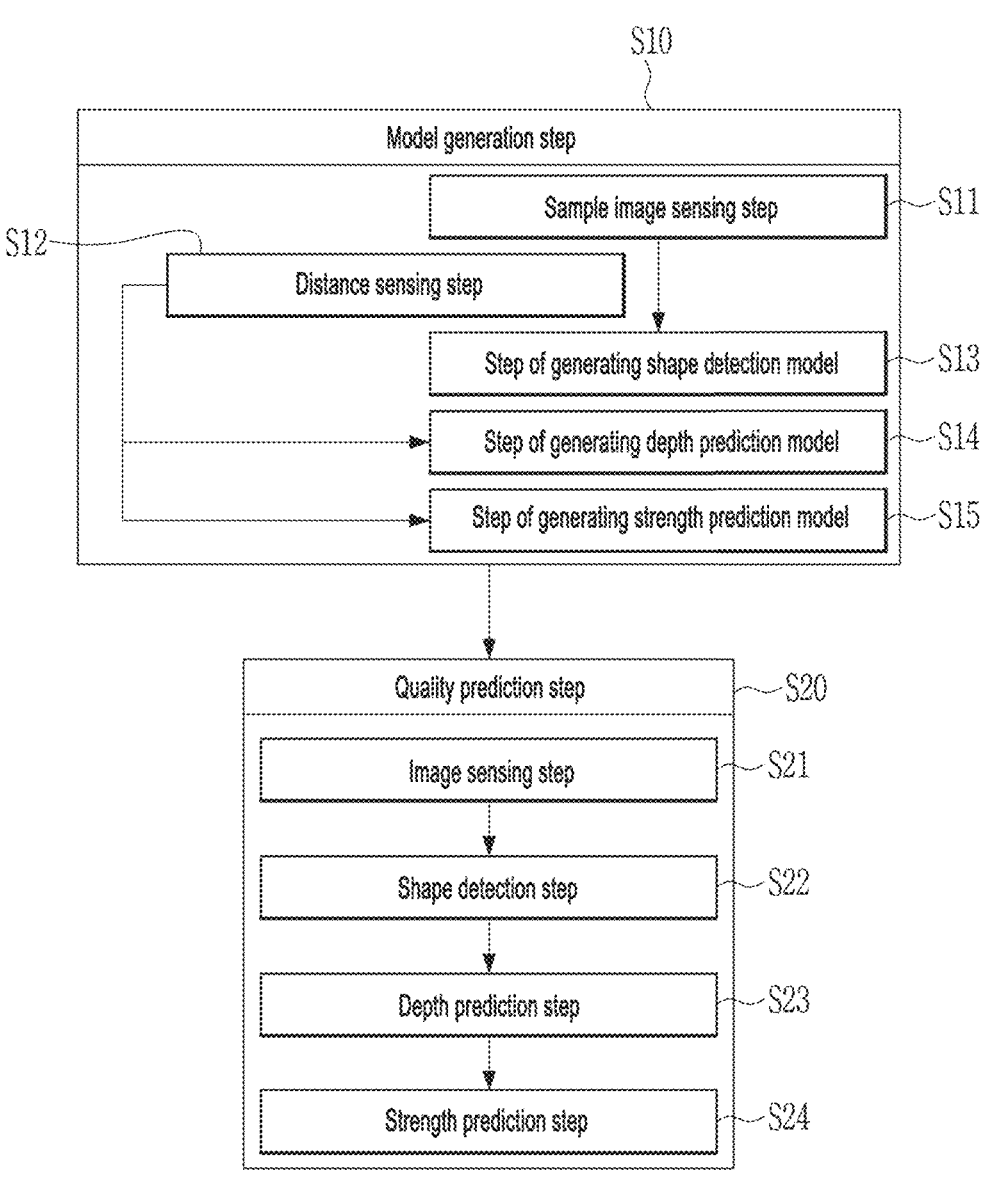
FIG. 3 is a block diagram showing a method for predicting weld quality in accordance with an embodiment.

FIG. 3 is a block diagram showing a method for predicting weld quality in accordance with an embodiment.

The method for predicting weld quality in accordance with the embodiment may include a model generation step S10 of generating the shape detection model M1, the depth prediction model M2 and the strength prediction model M3 by learning artificial intelligence models using learning datasets, and a quality prediction step S20 of acquiring shapes of a melt pool and a keyhole by inputting the image of a welding portion of the workpiece 23 to the shape detection model M1, acquiring the penetration depth of the keyhole by inputting the shapes of the melt pool and the keyhole to the depth prediction model M2 and acquiring a tensile strength by inputting one of the shape of the melt pool, the shape of the keyhole and the shapes of the melt pool and the keyhole and the penetration depth of the keyhole to the strength prediction model M3.

The model generation step S10 is a process of generating artificial intelligence models to be used in the process of predicting weld quality. The model generation step S10 may acquire data for learning artificial intelligence models, by observing a process of welding the sample workpiece 23, and may learn the artificial intelligence models. In the model generation step S10, the apparatus 10 for predicting weld quality may further use the distance sensor 12. The quality prediction step S20 is a process of inspecting the weld quality of the workpiece 23 in a product manufacturing process. In the quality prediction step S20, the apparatus 10 for predicting weld quality may not use the distance sensor 12.

The model generation step S10 may include a sample image sensing step S11 of acquiring the image of the welding portion while welding the sample workpiece 23, a distance sensing step S12 of measuring the penetration depth of the keyhole formed in the welding portion, a step S13 of generating the shape detection model M1 using a first learning dataset in which the sample image is first learning data and the shapes of the melt pool and the keyhole defined on the basis of the sample image are first label data, a step S14 of generating the depth prediction model M2 using a second learning dataset in which the shapes of the melt pool and the keyhole are second learning data and the penetration depth of the keyhole measured in the distance sensing step S12 is second label data, and a step S15 of generating the strength prediction model M3 using a third learning dataset in which one of the shape of the melt pool, the shape of the keyhole and the shapes of the melt pool and the keyhole defined on the basis of the sample image and the penetration depth of the keyhole measured in the distance sensing step S12 are third learning data and the tensile strength of the welding portion of the sample workpiece 23 is third label data.

The sample image sensing step S11 is a process of acquiring the image of the welding portion to be used as learning data, by observing a process of welding the sample workpiece 23. The image sensor 11 may acquire the image of the welding portion of the sample workpiece 23 and provide the image to the controller 13. The image acquired by capturing the sample workpiece 23 may include the melt pool and the keyhole.

The distance sensing step S12 is a process of acquiring the penetration depth of the keyhole to be uses as label data or learning data, by observing the process of welding the sample workpiece 23. The distance sensing step S12 is performed in the model generation step S10, and may be omitted in the quality prediction step S20. In the distance sensing step S12, the distance sensor 12 may acquire the penetration depth of the keyhole formed in the welding portion of the sample workpiece 23 and provide the penetration depth to the controller 13.

The shape detection model M1, the depth prediction model M2 and the strength prediction model M3 may be independently learned.

Figure 4:
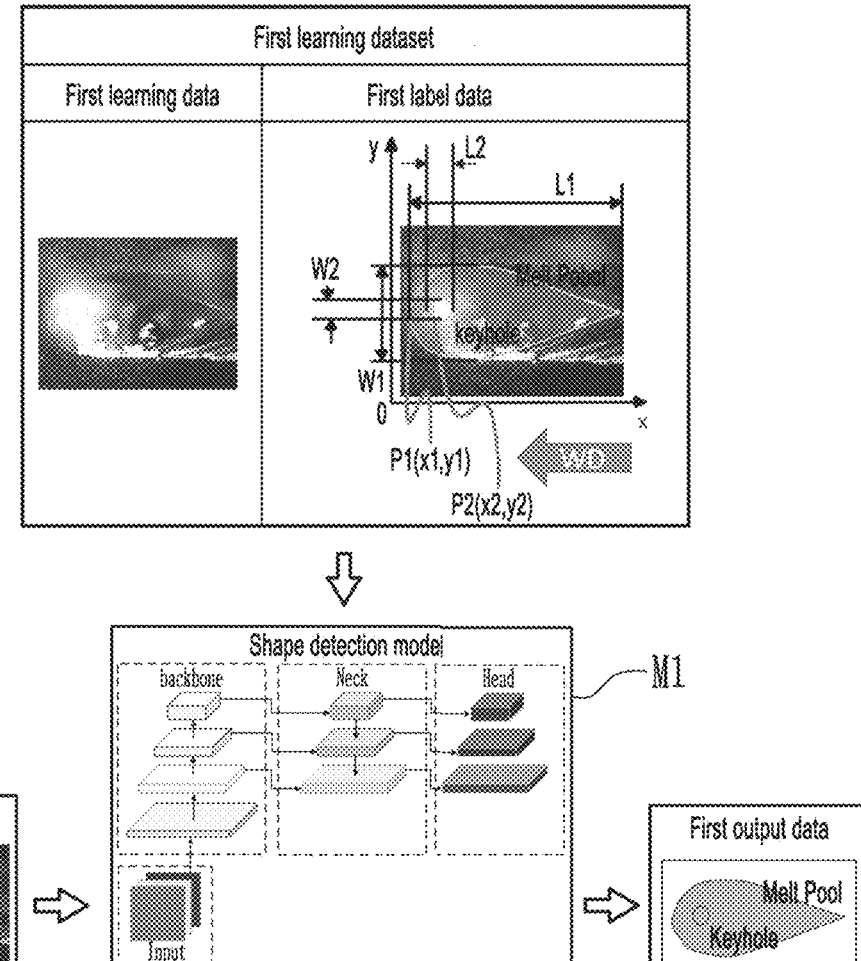
FIG. 4 is a diagram explaining shape detection in accordance with an embodiment.

FIG. 4 is a diagram explaining shape detection in accordance with an embodiment.

The step S13 of generating the shape detection model M1 is a process of generating the shape detection model M1 using the first learning dataset. The shape detection model M1 is an artificial intelligence model learned using the first learning dataset in which the image of the welding portion is the first learning data and the shapes of the melt pool and the keyhole are the first label data, and when the image of the welding portion is received, may detect and output the shapes of the melt pool and the keyhole.

The image included in the first learning data is the image acquired by capturing the welding portion of the sample workpiece 23 in the sample image sensing step S11. The shapes of the melt pool and the keyhole included in the first label data are the shapes of the melt pool and the keyhole acquired from the image acquired in the sample image sensing step S11. The first learning dataset may include a plurality of pairs of first learning data and first label data.

The shapes of the melt pool and the keyhole may be expressed as lines on the image. The lines may be formed at the border of the melt pool, and may be formed around the keyhole. The shapes of the melt pool and the keyhole refer to the shape of the melt pool and the shape of the keyhole. The shape of the melt pool may include the position and size of the melt pool, and the shape of the keyhole may include the position and size of the keyhole.

As the shapes of the melt pool and the keyhole, the position and size of the melt pool and the position and size of the keyhole may be expressed as coordinates on the image. The size of the melt pool may include a length $L1$ of the melt pool in the welding direction WD and a width $W1$ of the melt pool in a direction perpendicular to the welding direction WD. The position of the melt pool may be expressed as the position $P1(x1,y1)$ of a frontmost boundary point in the welding direction WD of the melt pool when the image is expressed in the Cartesian coordinate system. The size of the keyhole may include a length $L2$ of the keyhole in the welding direction WD and a width $W2$ of the keyhole in the direction perpendicular to the welding direction WD. The position of the keyhole may be expressed as the position $P2(x2,y2)$ of a frontmost boundary point in the welding direction WD of the keyhole when the image is expressed in the Cartesian coordinate system.

While welding the sample workpiece 23, the image of the welding portion is acquired, the shapes of the melt pool and the keyhole are determined for each image of the welding portion to form the first learning dataset, and the shape detection model M1 is learned.

The shape detection model M1 may be an artificial intelligence model configured by a backbone structure in which feature maps of various scales are extracted while passing the image through multiple convolution layers, a neck structure in which the scales of the feature maps extracted in the backbone structure are up-down sampled and combined, and a head structure in which classification and detection are performed using the feature maps combined in the neck structure.

The shape detection model M1 may be a convolutional neural network (CNN)-based neural network including the backbone structure, the neck structure and the head structure. The shape detection model M1 may receive the first learning data and extract the features of the melt pool or the keyhole in the backbone structure. The backbone structure may include the multiple convolution layers. The convolution layers may have different scales. The backbone structure may extract a plurality of feature maps of various scales while changing the scales of the first learning data. The neck structure receives the feature map extracted for each scale of the backbone structure, performs a process of up-sampling or down-sampling a scale and combining the feature map with a feature map of a different scale, and thereby, generates a combined feature map for each scale. The head structure may classify and detect an object for each scale by receiving the combined feature map generated by the neck structure. The head structure may synthesize objects classified and detected for respective scales and finally recognize the object.

The shape detection model M1 may receive the image of the welding portion of the first learning data and output the shapes of the melt pool and the keyhole existing in the image, and by comparing the shapes of the melt pool and the keyhole with the shapes of the melt pool and the keyhole of the first label data, may be learned in a direction in which an error decreases.

Figure 5:
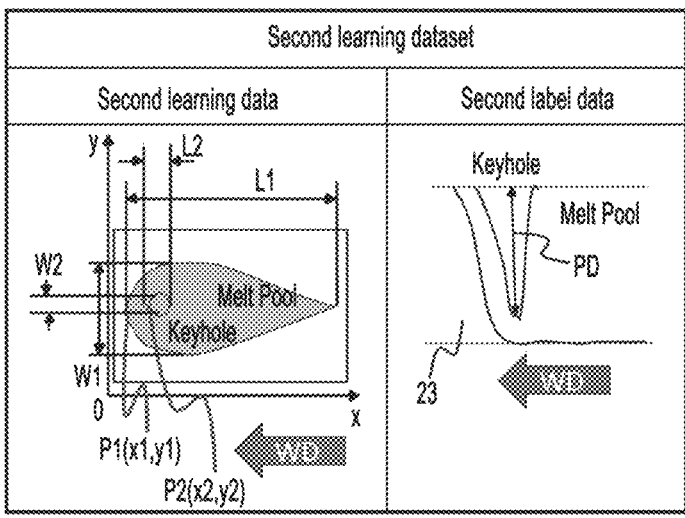
FIG. 5 is a diagram explaining depth prediction in accordance with an embodiment.
Figure 5:
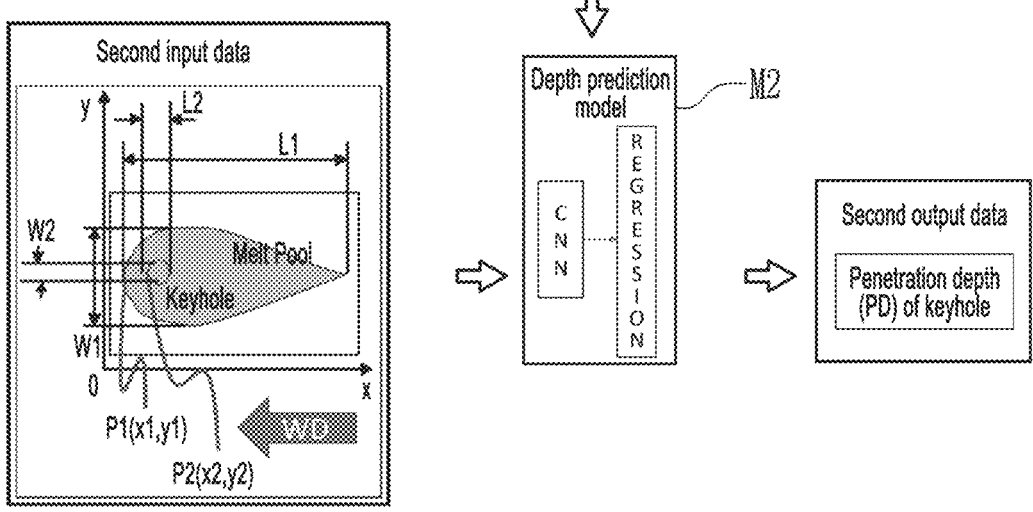

FIG. 5 is a diagram explaining depth prediction in accordance with an embodiment.

The step S14 of generating the depth prediction model M2 is a process of generating the depth prediction model M2 using the second learning dataset. The depth prediction model M2 is an artificial intelligence model learned using the second learning dataset in which the shapes of the melt pool and the keyhole are the second learning data and the penetration depth PD of the keyhole is the second label data, and when the shapes of the melt pool and the keyhole are inputted, may predict and output the penetration depth PD of the keyhole.

The shapes of the melt pool and the keyhole included in the second learning data are the shapes of the melt pool and the keyhole acquired from the image acquired in the sample image sensing step S11. The penetration depth PD of the keyhole included in the second label data is acquired in the distance sensing step S12. The second learning dataset may include a plurality of pairs of second learning data and second label data.

The shapes of the melt pool and the keyhole were explained above with reference to FIG. 4. The penetration depth PD of the keyhole may be acquired in such a way to subtract the distance between a distance sensor 12 and the sample workpiece 23 from a distance acquired by the optical coherence tomography. The penetration depth PD of the keyhole is the distance from the deepest point of the keyhole to the top surface of the sample workpiece 23.

The depth prediction model M2 is learned using the second learning dataset.

The depth prediction model M2 may have a convolutional neural network (CNN) structure which extracts features, and may be an artificial intelligence model which extracts a scalar value by applying a linear function in the last layer of the convolutional neural network structure.

The depth prediction model M2 is an artificial intelligence model based on the convolutional neural network (CNN) structure, and uses a linear function in the last layer of the convolutional neural network structure. A general convolutional neural network structure uses a nonlinear function such as ReLu, Sigmoid and hyperbolic tangent (tanh). The depth prediction model M2 in accordance with the embodiment may output a scalar value by linearly outputting a value outputted by the convolutional neural network structure using a linear function.

The depth prediction model M2 may output the penetration depth PD of the keyhole by extracting features by receiving the shapes of the melt pool and the keyhole of the second learning data and linearly synthesizing the features, and by comparing the penetration depth PD of the keyhole with the penetration depth PD of the keyhole of the second label data, may be learned in a direction in which an error decreases.

Figure 6:
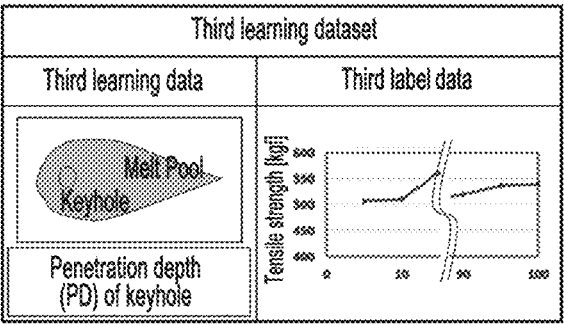
FIG. 6 is a diagram explaining strength prediction in accordance with an embodiment.
Figure 6:
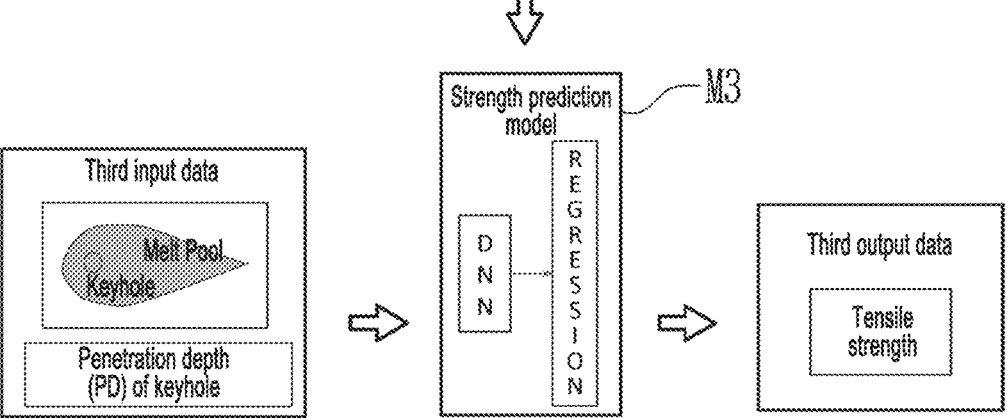

FIG. 6 is a diagram explaining strength prediction in accordance with an embodiment.

The step S15 of generating the strength prediction model M3 is a process of generating the strength prediction model M3 using the third learning dataset. The strength prediction model M3 is an artificial intelligence model learned using the third learning dataset in which one of the shape of the melt pool, the shape of the keyhole and the shapes of the melt pool and the keyhole and the penetration depth PD of the keyhole are the third learning data and the tensile strength of the welding portion is the third label data, and when one of the shape of the melt pool, the shape of the keyhole and the shapes of the melt pool and the keyhole and the penetration depth PD of the keyhole are inputted, may predict and output the tensile strength of the welding portion. The third learning data may necessarily include the penetration depth PD of the keyhole, and may additionally include one of the shape of the melt pool, the shape of the keyhole and the shapes of the melt pool and the keyhole. The strength prediction model M3 may be learned to receive the penetration depth PD of the keyhole and the shape of the melt pool, may be learned to receive the penetration depth PD of the keyhole and the shape of the keyhole, or may be learned to receive the penetration depth PD of the keyhole, the shape of the melt pool and the shape of the keyhole.

One of the shape of the melt pool, the shape of the keyhole, and the shapes of the melt pool and the keyhole included in the third learning data may be one acquired by inputting the image acquired in the sample image sensing step S11 to the shape detection model M1. The penetration depth PD of the keyhole included in the third learning data is acquired in the distance sensing step S12. The tensile strength included in the third label data may be acquired by performing a tensile strength test using a sample workpiece which is completely welded. Tensile strength may be measured for each welding length. That is to say, tensile strength may be measured at each point from a welding start point to a welding end point of the sample workpiece. At a point with the same welding length, the shapes of the melt pool and the keyhole and the penetration depth of the keyhole are the third learning data, and the tensile strength is the third label data. The third learning dataset may include a pair of third learning data and third label data for each welding length.

The strength prediction model M3 is learned using the third learning dataset.

The strength prediction model M3 may have a deep neural network (DNN) structure which extracts the features of one of the shape of the melt pool, the shape of the keyhole and the shapes of the melt pool and the keyhole and the penetration depth PD of the keyhole, and may be an artificial intelligence model which extracts a scalar value by applying a linear function in the last layer of the deep neural network structure.

The strength prediction model M3 is an artificial intelligence model based on the deep neural network (DNN) structure, and uses a linear function in the last layer of the deep neural network structure. Unlike that a general deep neural network structure uses a non-linear function, the strength prediction model M3 in accordance with the embodiment uses a linear function in the last layer. The strength prediction model M3 in accordance with the embodiment may output a scalar value by linearly outputting a value outputted by the deep neural network structure using a linear function.

The strength prediction model M3 may output a tensile strength by extracting features by receiving one of the shape of the melt pool, the shape of the keyhole and the shapes of the melt pool and the keyhole and the penetration depth PD of the keyhole of the third learning data and linearly synthesizing the features, and by comparing the tensile strength with the tensile strength of the third label data, may be learned in a direction in which an error decreases.

Reference is now made back to FIG. 3.

The quality prediction step S20 is a process of predicting the weld quality of the welding portion in the process of welding the workpiece 23 included in the product. The quality prediction step S20 may be performed in real time in the process of producing the product. The quality prediction step S20 may include an image sensing step S21 of acquiring the image of the welding portion of the workpiece 23, a shape detection step S22 of acquiring the shapes of the melt pool and the keyhole by inputting the image to the shape detection model M1, a depth prediction step S23 of acquiring the penetration depth PD of the keyhole by inputting the shapes of the melt pool and the keyhole to the depth prediction model M2, and a strength prediction step S24 of acquiring a tensile strength by inputting one of the shape of the melt pool, the shape of the keyhole and the shapes of the melt pool and the keyhole acquired in the shape detection step S22 and the penetration depth PD of the keyhole acquired in the depth prediction step S23, to the strength prediction model M3.

The image sensing step S21 is a process of acquiring the image of the welding portion of the workpiece 23 and providing the image to the controller 13. The image sensing step S21 may be repeatedly performed while welding is performed. The controller 13 may perform three-step prediction to predict weld quality using the image provided in the image sensing step S21.

Figure 7:
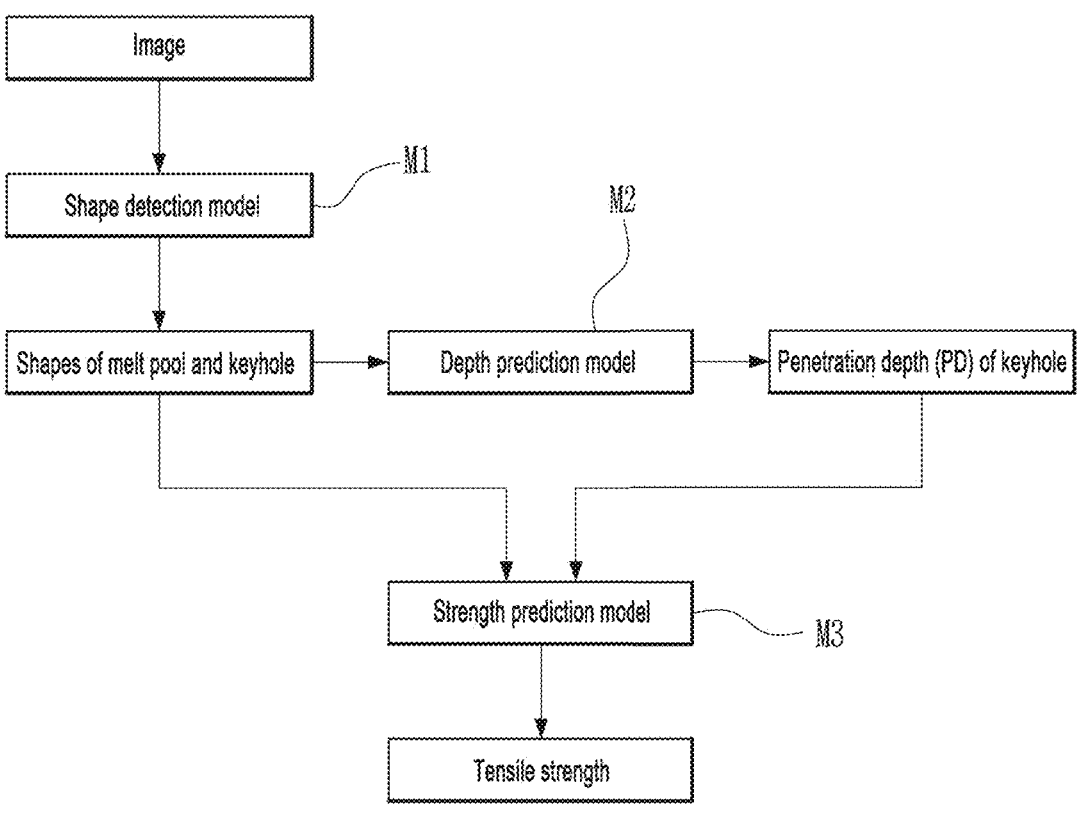
FIG. 7 is a diagram explaining three-step prediction in accordance with an embodiment.

Reference is now made to FIGS. 4, 5, 6 and 7 together. FIG. 7 is a diagram explaining three-step prediction in accordance with an embodiment.

Reference is now made to FIGS. 4 and 7. The controller 13 may perform the shape detection step S22 using the image received in the image sensing step S21. In the shape detection step S22, the controller 13 may input the image acquired from the image sensor 11 to the shape detection model M1 as first input data, and may acquire the shapes of the melt pool and the keyhole as first output data outputted by the shape detection model M1.

Reference is now made to FIGS. 5 and 7. After performing the shape detection step S22, the controller 13 may perform the depth prediction step S23. In the depth prediction step S23, the controller 13 may input the shapes of the melt pool and the keyhole acquired as the first output data in the shape detection step S22 to the depth prediction model M2 as second input data, and may acquire the penetration depth PD of the keyhole as second output data outputted by the depth prediction model M2.

Reference is now made to FIGS. 6 and 7. After performing the depth prediction step S23, the controller 13 may perform the strength prediction step S24. In the strength prediction step S24, the controller 13 may input one of the shape of the melt pool, the shape of the keyhole and the shapes of the melt pool and the keyhole acquired as the first output data in the shape detection step S22 and the penetration depth PD of the keyhole acquired as the second output data in the depth prediction step S23 to the strength prediction model M3 as third input data, and may acquire a tensile strength as third output data outputted by the strength prediction model M3. Tensile strength may be acquired at each point from a welding start point to a welding end point of a workpiece. Therefore, the user may recognize at which welding point tensile strength is low.

The first input data inputted to the shape detection model M1 is the image acquired by the image sensor 11, and the first output data outputted by the shape detection model M1 is the shapes of the melt pool and the keyhole. The second input data inputted to the depth prediction model M2 is the shapes of the melt pool and the keyhole as the first output data of the shape detection model M1, and the second output data outputted by the depth prediction model M2 is the penetration depth PD of the keyhole. The third input data inputted to the strength prediction model M3 is one of the shape of the melt pool, the shape of the keyhole and the shapes of the melt pool and the keyhole as the first output data of the shape detection model M1 and the penetration depth PD of the keyhole as the second output data of the depth prediction model M2, and the third output data of the strength prediction model M3 is a tensile strength.

As described above, the method for predicting weld quality in accordance with the embodiment performs three-step prediction. The controller 13 may sequentially predict, on the basis of the image of the welding portion, the shapes of the melt pool and the keyhole, the penetration depth of the keyhole and a tensile strength. When prediction is sequentially performed in three steps, since factors that exert influence on tensile strength are sequentially reflected in the prediction, the prediction accuracy of tensile strength is high. In addition, since the shape detection model M1, the depth prediction model M2 and the strength prediction model M3 are independently learned, prediction accuracy is high in each step. In the method for predicting weld quality in accordance with the embodiment, since tensile strength may be predicted by sequentially learning all of the image of the welding portion, the shapes of the melt pool and the keyhole and the penetration depth of the keyhole, it is possible to achieve excellent performance compared to a method for predicting weld quality using any one of the image, the shapes of the melt pool and the keyhole and the penetration depth.

Although the embodiment of the present disclosure has been described for illustrative purposes, it will be appreciated that the present disclosure is not limited thereto. Those skilled in the art will appreciate that various modifications, additions and substitutions are possible without departing from the scope and spirit of the present disclosure.

Accordingly, any and all modifications, variations or equivalent arrangements should be considered to be within the scope of the present disclosure, and the detailed scope of the present disclosure will be defined by the accompanying claims.

What is claimed is:

1. An apparatus for predicting weld quality, the apparatus comprising:

an image sensor acquiring an image of a welding portion of a workpiece;

a storage storing a shape detection model, a depth prediction model and a strength prediction model; and a controller configured to acquire shapes of a melt pool and a keyhole by receiving the image and inputting the image to the shape detection model, acquire a penetration depth of the keyhole by inputting the shapes of the melt pool and the keyhole to the depth prediction model, and acquire a tensile strength by inputting the penetration depth of the keyhole and one of the shape of the melt pool, the shape of the keyhole, or the shapes of both the melt pool and the keyhole to the strength prediction model, wherein the shape detection model is an artificial intelligence model learned using a first learning dataset in which the image of the welding portion is first learning data and the shapes of the melt pool and the keyhole are first label data, and when the image of the welding portion is received, detects and outputs the shapes of the melt pool and the keyhole, wherein the depth prediction model is an artificial intelligence model learned using a second learning dataset in which the shapes of the melt pool and the keyhole are second learning data and the penetration depth of the keyhole is second label data, and when the shapes of the melt pool and the keyhole are inputted, predicts and outputs the penetration depth of the keyhole, wherein the strength prediction model is an artificial intelligence model learned using a third learning dataset in which the penetration depth of the keyhole and one of the shape of the melt pool, the shape of the keyhole or the shapes of both the melt pool and the keyhole are third learning data and the tensile strength of the welding portion is third label data, and when the penetration depth of the keyhole and one of the shape of the melt pool, the shape of the keyhole or the shapes of both the melt pool and the keyhole are inputted, predicts and outputs the tensile strength of the welding portion.

2. The apparatus of claim 1, wherein the shape detection model is an artificial intelligence model configured by a backbone structure in which feature maps of various scales are extracted while passing the image through multiple convolution layers, a neck structure in which the scales of the feature maps extracted in the backbone structure are up-sampled or down-sampled and combined, and a head structure in which classification and detection are performed using the feature maps combined in the neck structure.

3. The apparatus of claim 1, wherein the shape of the melt pool includes a position and size of the melt pool, and the shape of the keyhole includes a position and size of the keyhole.

4. The apparatus of claim 1, wherein the tensile strength is acquired at each point from a welding start point to a welding end point of the workpiece.

5. The apparatus of claim 1, wherein the depth prediction model has a convolutional neural network structure which extracts features, and is an artificial intelligence model which extracts a scalar value by applying a linear function in a last layer of the convolutional neural network structure.

6. The apparatus of claim 1, wherein the strength prediction model has a deep neural network structure which extracts features of the penetration depth of the keyhole and one of the shape of the melt pool, the shape of the keyhole or the shapes of both the melt pool and the keyhole, and is an artificial intelligence model which extracts a scalar value by applying a linear function in a last layer of the deep neural network structure.

7. The apparatus of claim 1, further comprising:

a distance sensor measuring the penetration depth of the keyhole of the welding portion in a process of welding a sample of the workpiece, wherein the controller stores the measured penetration depth of the keyhole in the storage as label data for learning the depth prediction model.

8. A method for predicting weld quality, the method comprising:

a model generation step of generating a shape detection model, a depth prediction model and a strength prediction model by learning artificial intelligence models using learning datasets; and a quality prediction step of acquiring shapes of a melt pool and a keyhole by inputting an image of a welding portion of a workpiece to the shape detection model, acquiring a penetration depth of the keyhole by inputting the shapes of the melt pool and the keyhole to the depth prediction model and acquiring a tensile strength by inputting the penetration depth of the keyhole and one of the shape of the melt pool, the shape of the keyhole, or the shapes of both the melt pool and the keyhole to the strength prediction model, wherein the shape detection model is an artificial intelligence model learned using a first learning dataset in which the image of the welding portion is first learning data and the shapes of the melt pool and the keyhole are first label data, and when the image of the welding portion is received, detects and outputs the shapes of the melt pool and the keyhole, wherein the depth prediction model is an artificial intelligence model learned using a second learning dataset in which the shapes of the melt pool and the keyhole are second learning data and the penetration depth of the keyhole is second label data, and when the shapes of the melt pool and the keyhole are inputted, predicts and outputs the penetration depth of the keyhole, wherein the strength prediction model is an artificial intelligence model learned using a third learning dataset in which the penetration depth of the keyhole and one of the shape of the melt pool, the shape of the keyhole or the shapes of both the melt pool and the keyhole are third learning data and the tensile strength of the welding portion is third label data, and when the penetration depth of the keyhole and one of the shape of the melt pool, the shape of the keyhole or the shapes of both the melt pool and the keyhole are inputted, predicts and outputs the tensile strength of the welding portion.

9. The method of claim 8, wherein the model generation step comprises:

a sample image sensing step of acquiring an image of the welding portion while welding the workpiece;

a distance sensing step of measuring the penetration depth of the keyhole formed in the welding portion;

a step of generating the shape detection model using the first learning dataset;

a step of generating the depth prediction model using the second learning dataset;

a step of generating the strength prediction model using the third learning dataset.

10. The method of claim 8, wherein the quality prediction step comprises:

an image sensing step of acquiring the image of the welding portion of the workpiece;

a shape detection step of acquiring the shapes of the melt pool and the keyhole by inputting the image to the shape detection model;

a depth prediction step of acquiring the penetration depth of the keyhole by inputting the shapes of the melt pool and the keyhole to the depth prediction model; and a strength prediction step of acquiring a tensile strength by inputting the penetration depth of the keyhole acquired in the depth prediction step and one of the shape of the melt pool, the shape of the keyhole and the shapes of both the melt pool and the keyhole acquired in the shape detection step, to the strength prediction model.

11. The method of claim 8, wherein the shape of the melt pool includes a position and size of the melt pool, and the shape of the keyhole includes a position and size of the keyhole.

12. The method of claim 10, wherein the tensile strength is acquired at each point from a welding start point to a welding end point of the workpiece.

* * * * *